United States Patent
Finkle

(10) Patent No.: US 8,644,474 B2
(45) Date of Patent: Feb. 4, 2014

(54) METHOD AND SYSTEM FOR CONNECTING A TELEPHONE CALL TO A THIRD PARTY

(76) Inventor: Matthew Finkle, Westport, CT (US)

(*) Notice: Subject to any disclaimer, the term of this patent is extended or adjusted under 35 U.S.C. 154(b) by 711 days.

(21) Appl. No.: 12/803,734

(22) Filed: Jul. 1, 2010

(65) Prior Publication Data

US 2011/0002453 A1 Jan. 6, 2011

Related U.S. Application Data

(60) Provisional application No. 61/222,145, filed on Jul. 1, 2009.

(51) Int. Cl.
*H04M 3/42* (2006.01)

(52) U.S. Cl.
USPC .............................. 379/201.02; 379/142.05

(58) Field of Classification Search
USPC ............ 379/265.01, 265.02, 265.11, 265.13, 379/142.01, 142.04, 142.05, 201.02
See application file for complete search history.

(56) References Cited

U.S. PATENT DOCUMENTS

| | | | | |
|---|---|---|---|---|
| 5,703,943 A * | 12/1997 | Otto | | 379/265.11 |
| 5,835,570 A * | 11/1998 | Wattenbarger | | 379/88.03 |
| 5,905,792 A * | 5/1999 | Miloslavsky | | 379/265.11 |
| 7,409,047 B1 * | 8/2008 | Bhadriraju et al. | | 379/88.03 |
| 8,155,276 B2 * | 4/2012 | Beauregard et al. | | 379/74 |
| 2005/0129211 A1 * | 6/2005 | Gallagher et al. | | 379/265.02 |

* cited by examiner

*Primary Examiner* — Olisa Anwah
(74) *Attorney, Agent, or Firm* — Ware, Fressola, Maguire & Barber LLP

(57) ABSTRACT

A method and a system that allows a person to contact one or more companies with which the person has a relationship, such that the person can contact each company using a single telephone number. According to a first embodiment, a method is provided comprising receiving a call from a person (member) requesting to contact a first company; accessing a member profile stored on a database, the member profile comprising information regarding the identity of the person and identities of one or more companies selected by the person; verifying the identity of the person; verifying the request to contact the first company by determining if the first company is one company stored in the member profile; and then transferring the verified request to the first company by way of a dedicated number, so as to rapidly access an agent.

16 Claims, 4 Drawing Sheets

METHOD AND SYSTEM FOR CONNECTING A TELEPHONE CALL TO A THIRD PARTY

CROSS REFERENCE TO RELATED APPLICATION

This application claims priority under 35 USC §119 to U.S. Provisional Patent Application No. 61/222,145 filed on Jul. 1, 2009.

FIELD OF THE INVENTION

The present invention relates to a method and system for providing a person with a single (toll-free) number to call in order to reach any one of multiple companies (third parties) the person would like to reach, particularly by providing a number that calls a switching device which then transfers the call to a private branch exchange of the desired company, which then forwards the call to an available agent of that company, thereby bypassing an interactive voice response system.

BACKGROUND OF THE INVENTION

When a person calls a toll-free customer service phone number, such as for information on a credit card account or the like, the person is typically presented with an Interactive Voice Response ("IVR") system. This IVR system includes a series of prompts which enable the person to obtain information by pushing buttons on the phone or through voice recognition. At some point, the person is typically presented with the option to speak with a person, such as an agent or service representative of the company. Upon choosing this option, the caller is then placed in a hold queue, typically in the order in which the calls were received by the company, until an agent is available to take the call. Depending on the number of callers ahead in the queue, the amount of wait time for an agent can be brief or long. Many people experience frustration with the need to work through the various IVR prompts and the wait time for an agent when finally able to get into the hold queue.

People also need to dial different toll-free numbers for different accounts. For example, American Express has a specific phone number, as does Citibank, United Airlines, etc. It is inconvenient to keep track of and locate the different phone numbers for each company.

SUMMARY OF THE INVENTION

It is an object of this invention to provide a method and system that allows a person to conveniently contact one of a multitude of companies (third parties) with which the person has a relationship, wherein the person does not have to keep track of a separate phone number for each company and where the person can save time by not having to work through the various IVR prompts of the called company; thereby reducing the wait time to speak to an agent of the called company.

This invention is a method and system which provides the person with a single number (such as a toll-free number) to call in order to reach all of the companies that the person has a relationship with, instead of having to directly call each company individually. Furthermore, the present invention connects the person with each company in such a way that IVR prompts and caller queues are bypassed and which directly connects the customer with a first available agent. The frustration of dealing with IVR prompts and long waits is eliminated.

According to a first exemplary embodiment of the invention, a method is provided comprising: receiving a call from a person (e.g. a member, customer associated with the method) requesting to contact a first company; accessing a member profile stored on a database associated with this person, the member profile comprising, for example, one or more phone numbers or other information (e.g., a user name and password) associated with the person and the identities of one or more companies selectable by the person; verifying the identity of the person by comparing the number of the call (number associated with the phone used to place the call) with any one of the numbers of the identified person; verifying the request to contact the first company by determining if the first company is one of the companies stored in the member profile; and transferring the verified request to the first company by way of a dedicated number, so as to cause the first company to route the verified request to an available agent associated with the first company, and preferably in a way to access an agent with little or no waiting.

According to a further embodiment of the invention, the person (member) can use an Internet connection to create and edit the member profile on the database and to obtain a login identification that can be used to access and edit the member profile stored on the database.

According to a further embodiment of the invention, the identity of the person (member) can be verified by comparing a phone number from which the request from the member was received with the one or more phone numbers of the person stored in the member profile. The identity of the person (member) can also be verified by providing the person (member) with an identifying prompt requesting a response, such as a user name and password.

According to a second exemplary embodiment of the invention, a method is provided comprising receiving a call from a person made from a dedicated telephone number; assigning a specific dialed number identification service to the received call based on an identification of the dedicated number; receiving information regarding a company the person desires to speak with, and routing the received call based on the specific dialed number identification service to an agent of the desired company; whereby the routing bypasses an interactive voice response system and can also bypass a group of callers waiting to speak to the first available agent.

According to an embodiment of this method, the dedicated number corresponds to that of a switching device configured to receive a request from a person (member) to contact a first company, and to transfer the request to the first company after verifying the identity of the person and verifying the request to contact a first company by determining if the first company is one of a plurality of companies included in a member profile associated with the person.

According to a third exemplary embodiment of the invention, a system is provided, comprising a database configured to store a member profile comprising one or more phone numbers of a person (member) and identities of one or more companies selectable by the person; a first apparatus configured to receive a call from the person requesting to contact a first company; configured to access the member profile stored on the database; configured to verify the identity of the person; configured to verify the request to contact a first company by determining if the first company is one of the companies stored in the member profile; and configured to transfer the verified request to the first company by way of a dedicated number, for example, and a second apparatus configured to receive the verified request from a dedicated number; configured to assign a specific dialed number identification service to the received call based on an identification of the dedicated number; and configured to route the received call based on the specific dialed number identification service to an agent.

According to a further embodiment of the system, the person (member) can use an Internet connection to create and edit the member profile and to obtain a login identification that can be used to access and edit the member profile.

The method and system according to the various embodiments can be provided in a manner so that the person using the method or system can pay for its use by means of a credit card or debit card, in lieu of other payment methods, such as billing statements or the like.

According to even further embodiments of the system, the identity of the person (member) can be verified by comparing a phone number from which the request from the person was received with the one or more phone numbers of the person stored in a member profile. The identity of the person can also be verified by providing the member with an identifying prompt requiring a specific response (such as a user name and password).

It is an object of this invention to provide a method and system that can be used by a service to provide a person the convenience of not having to wait on hold to speak to an agent of a company the person is seeking to reach or keep track of the many phone numbers for all of the companies that the person has accounts with. Thus, the method and system of the present invention could be implemented, for example, by a website service that allows a person to sign up for the service in order to create a member profile and obtain a phone number that the person (member) can call to reach a switching device that will connect the member to a company they are attempting to contact, without waiting on hold to speak to an agent or waiting through any IVR prompts. In an additional embodiment of a service utilizing the method and system of the present invention, certain premium credit cards, such as "platinum" or other high-level cards, may see value in providing this service for their cardholders, as there would be a benefit in enabling the customer to get immediate, hassle-free customer service at all companies that they do business with and not just the card issuer itself.

BRIEF DESCRIPTION OF THE DRAWINGS

The invention will be illustrated in more detail in the following description of preferred embodiments, with reference to the attached drawings which are solely provided as illustrative but non-limiting examples, and wherein.

DETAILED DESCRIPTION OF THE DRAWINGS

Figure 1:
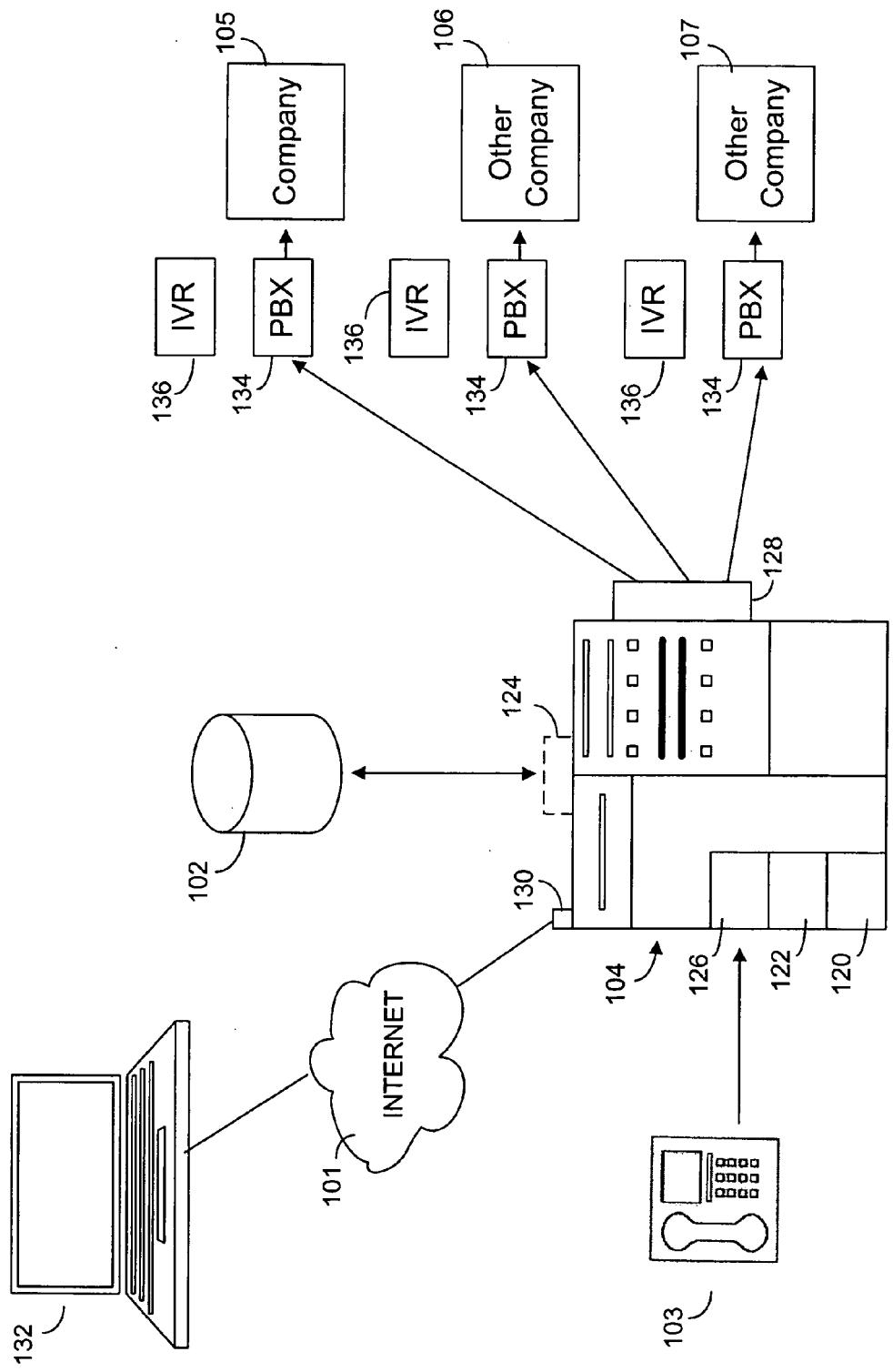
FIG. 1 is a diagram of the components of a system according to the invention.

The system according to the invention is described with reference to FIG. 1. The system is made functional by a switching device 104 and connectivity to the Internet 101. The switching device may typically include a processor 120, a memory 122 storing program code, an input/output 124, a telephone input port 126, telephone output port 128, and a connection 130 to the Internet. The processor, under program control, performs the actions recited herein. Dedicated hardware could also be used. First, a person establishes a profile via a web site, such as accessed by computer 132, over the Internet 101, where the person inputs or selects from a given list all of the person's company accounts with which the person wishes to connect with directly. This access to a web site can be performed by the switching device or a separate server (not shown). This profile and its corresponding information are stored in a database 102 that can be accessed by the switching device 104.

The switching device 104 typically has a single toll-free access number. Thus, when the person using phone 103 wishes to call a company 105, for example, American Express, instead of looking up the number for and calling American Express directly and dealing with the frustrations of the Interactive Voice Response (IVR) system and hold queue, the person calls the single toll-free number that accesses switching device 104 via phone port 126 and is either automatically recognized by the number the person is calling from or is prompted for a brief identifier requiring an appropriate response, such as a user name and password or access code. Once identified, the person indicates which company they wish to call (e.g., American Express) 105 through voice or push button on the phone. The switching device 104 validates the request against a member profile and then transfers the call to the desired company 105. The desired company 105 will have created a specific call routing procedure for calls coming from the switching device 104 via port 128. For example, a private branch exchange 134 (PBX) can be configured to perform this function, and routes the call directly to an agent, thereby bypassing an IVR 136 that otherwise prompts the caller. The result is to thereby bypass other callers in a live agent queue. All of the above steps typically occur in a rapid fashion.

The same process repeats itself when the customer seeks to call some other company, such as Citibank 106 or United Airlines 107. Instead of calling Citibank 106 directly, the person calls the toll-free number for the switching device and is transferred to an agent at Citibank 106. Once the member's profile is established, all the member (person) needs to do is use phone 103 to call a single (e.g., a toll-free) number at switching device 104 for immediate access to live assistance at any one of the companies the person has business relationships with (e.g., 105, 106, 107) as set forth in their member profile. The profile can be updated (edited) at any time to select new companies and/or remove old companies.

Figure 2:
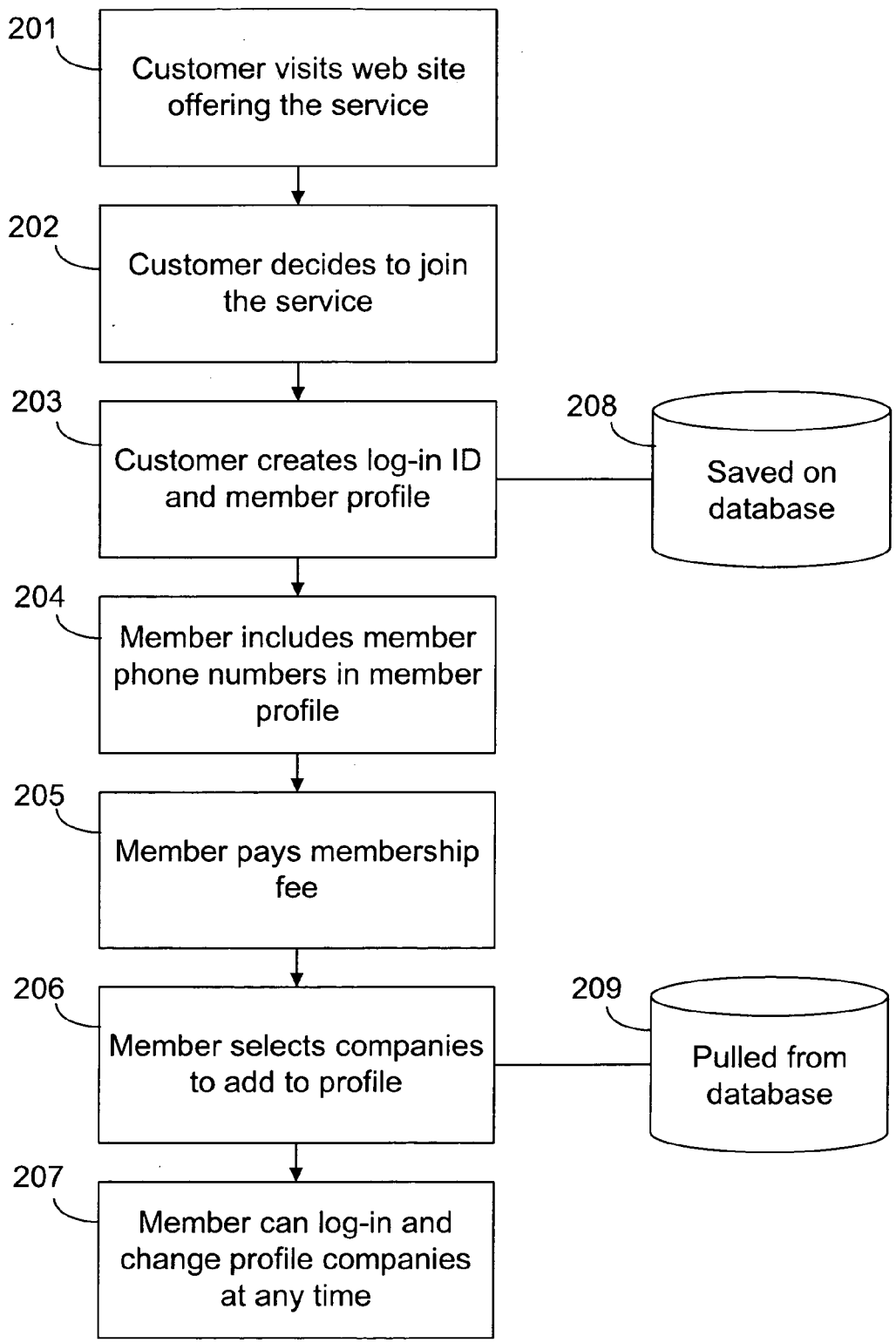
FIG. 2 is a flow diagram of an embodiment of a method for establishing a member profile to access the system according to the invention.

The method for establishing a member profile is discussed with reference to FIG. 2. In an embodiment, a person visits 201 the web site offering the service. When the person joins 203 the service 202, the person creates a log-in identification (such as the phone number(s) 204 to be used by the person and/or a user name and password, for example) and a member profile 203, both of which are stored 208 in a database (e.g., database 102). In creating the member profile, the member typically pays a membership fee 205, and includes in the member profile his or her phone numbers 204 and selects companies to be included in his or her profile 206. The companies selected can be companies to which the member is a customer and has a customer account, for example. The companies to be included in the member profile are obtained 209 from the database, which also stores information corresponding to the companies that participate in the service. Using the log-in identification, the member is able to change the member profile at any time, if the member wishes to add or remove companies in the member profile, or change the member's personal information included in the member profile.

Figure 3:
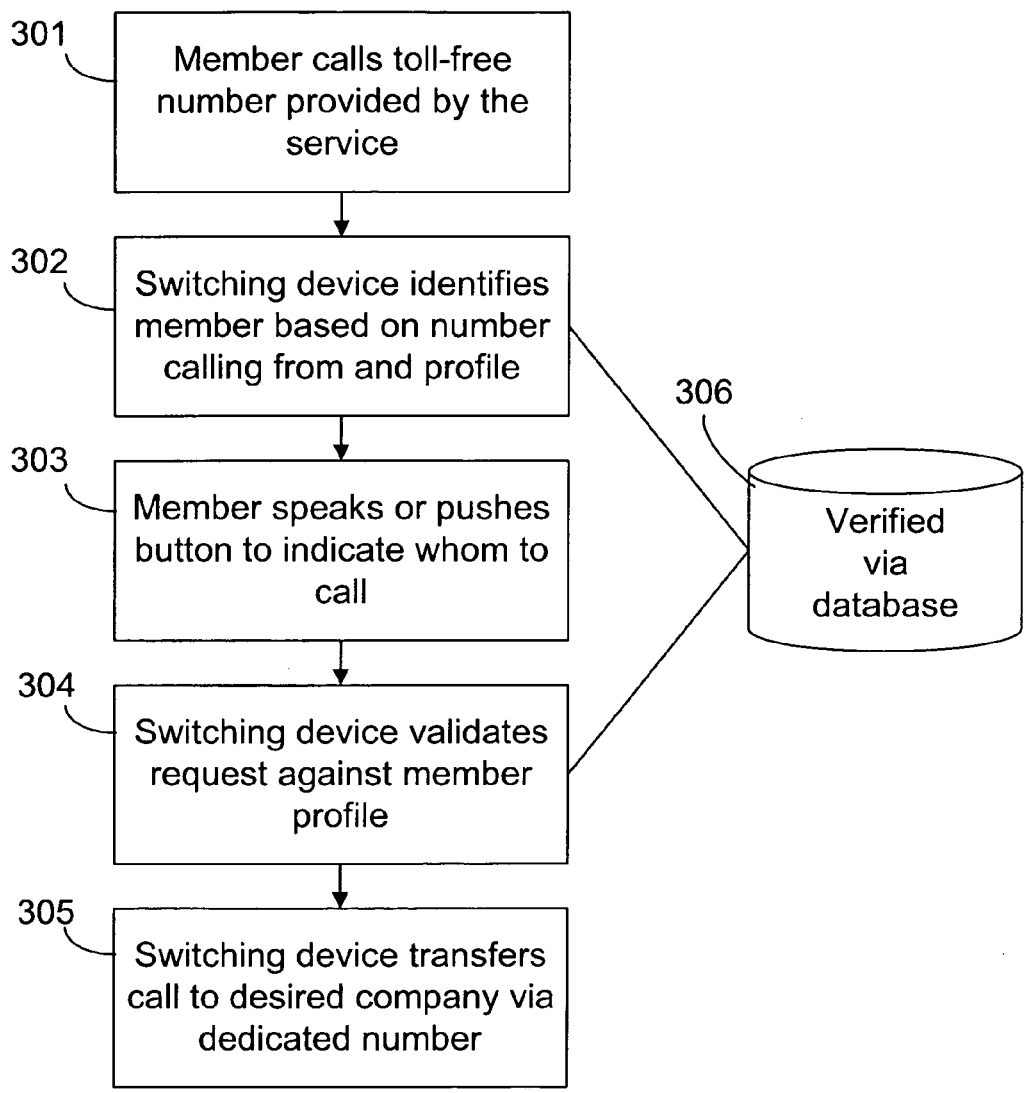
FIG. 3 is a flow diagram of an embodiment of a method for connecting a call to a company according to the invention.

The method for using the system to connect to a switching device which connects a customer to a company is discussed with reference to FIG. 3. By subscribing to the service, the member is provided a number (e.g., a toll-free number) which the member can call 301 in order to be connected to a switching device. Upon calling the number, the switching device identifies 302 the member. The identification can be performed by comparing the number used to call the switching device with the number or numbers that the member has included 204 in the member profile. If the calling number matches one of the numbers in the member profile, then the person calling the switching device is identified by the switching device as the member. Additionally or alternatively, the member can be identified by providing the calling person with a brief identifier and verifying the response with information included in the member profile stored 208 in the database (such as a user name and password matching a user name and password in the member profile). Once the identity of the member is verified, the member requests 303 the company the member wishes to speak with. This request can be made, for example, by pressing a series of buttons on the phone or by voice recognition. Other methods may, of course, be used. The switching device validates the request 303 by determining if the company the member requested to contact is a company that was included 206 in the member profile stored on the database 304. If so, then the switching device transfers 305 the call to the requested company, such as via a dedicated number, for example. The dedicated number is a number that the company can recognize as coming from the switching device which is part of the system used by the service to which the caller is a member. This dedicated number can provide direct or near-direct access to an agent of the company without requiring the person to deal with an IVR of the company or to wait in a phone queue.

Figure 4:
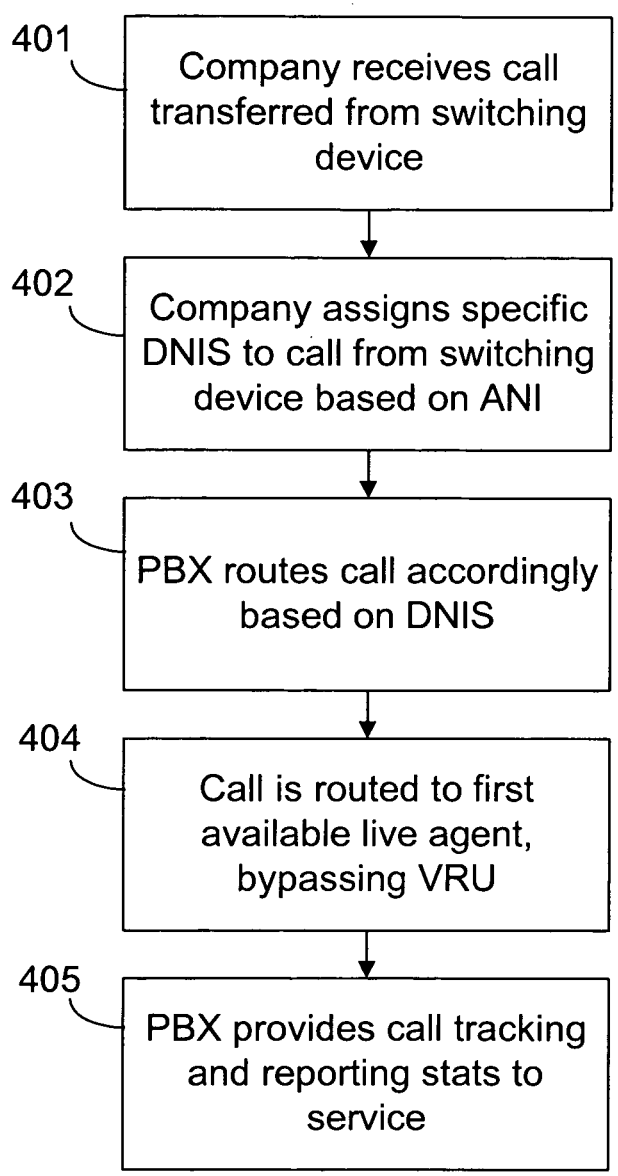
FIG. 4 is a flow diagram of an embodiment of a method for connecting a call to an agent of a company made according to the invention.

The method for using the system to connect to a call received by the company from the switching device to an available agent is discussed with reference to FIG. 4. The company receives the call 401 transferred from the switching device 305. The call is recognized as being made by the dedicated number, and is thus recognized as coming from the particular switching device. This allows the company to assign 402 a specific dialed number identification service ("DNIS") based on an automatic number identification ("ANI") of the dedicated number, for example. Based on the DNIS, a private branch exchange (PBX) routes 403 the call to a specific center or agent. The call is routed 404 to an agent, such as the first available agent, thereby bypassing the voice recognition unit ("VRU") or IVR prompts, and bypassing any other callers on hold in the queue line. The PBX provides the tracking and reporting statistics to the service the member has subscribed to.

Thus, what has been described is a method and system that provides a person who is a member of the method and/or system to call a single (e.g., toll-free) number in order to reach any one of a plurality of companies that the person would like to reach without having to directly call the company and otherwise use the company's Interactive Voice Response system. The method and system directs the member to a switching device which in turn identifies the person as a member and which then allows the member to direct the call to a particular company that the member desires to speak with. The switching device then validates the request against a member profile stored in a database and if validated, switches the member to a desired company so as to reach an agent or customer representative without having to call the company and interact with its interactive voice response system.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
receiving a call from a person requesting to contact a first company;
accessing a member profile stored on a database associated with the person, the member profile comprising identifying information associated with the person and the identities of one or more companies selectable by the person;
verifying the identity of the person, wherein the verifying the identity of the person comprises comparing the number of the call received from the person with any one of one or more numbers associated with the person in the person's member profile;
verifying the request to contact the first company by determining if the first company is one of the companies stored in the member profile; and
transferring the verified request to the first company by way of a dedicated number.

2. The method according to claim 1, wherein the dedicated number of the requested company is associated with an available agent of the first company.

3. The method according to claim 1, wherein the action of verifying the identify of the person includes verifying a user name and password received from the person with a user name and password associated with the person in the person's member profile.

4. The method according to claim 1, further comprising recognizing the verified request by the first company and directly routing the call to an agent of the first company.

5. An apparatus comprising:
a switching device configured to receive incoming calls, and a memory for storing a database comprising member profiles, each member profile associated with a person, the member profile comprising identifying information associated with the person and the identities of one or more companies selectable by the person;
wherein the switching device is configured to verify the identity of a person placing a call to the switching device and to verify a request from the person to contact a company by determining if the company is one of the companies stored in the member profile associated with the person and, if verified, configured to transfer the verified request to the company by way of a dedicated number, wherein the switching unit is configured so as to verify the identity of the person by comparing the number of the call received from the person with any one of one or more numbers associated with the person in the person's member profile.

6. The apparatus according to claim 5, wherein the dedicated number of the requested company is associated with an available agent of the said company.

7. The apparatus according to claim 5, wherein the switching unit is configured so that the verifying the identity of the person includes verifying a user name and password received from the person with a user name and password associated with the person in the person's member profile.

8. The method according to claim 1, further comprising recognizing the verified request to contact said company and directly routing the call to an agent of the first company.

9. A method of transferring incoming calls comprising:
receiving a call from a person requesting to contact a first company;
accessing a member profile stored on a database associated with the person, the member profile comprising identifying information associated with the person and the identities of one or more companies selectable by the person;
verifying the identity of the person, wherein the verifying the identity of the person comprises comparing the number of the call received from the person with any one of one or more numbers associated with the person in the person's member profile;
verifying the request to contact the first company by determining if the first company is one of the companies stored in the member profile;
determining the telephone number of the incoming call;
if the telephone number of the received call is determined as a predetermined dedicated number, then assigning a specific dialed number identification service based on an automatic number identification of said dedicated number;
transferring the verified request to the first company; and
based upon said dialed number identification service, routing the incoming call to a specific center or agent.

10. The method according to claim 9, wherein the routing bypasses an interactive voice response system.

11. The method according to claim 9, wherein the routing is performed by a private branch exchange.

12. The method according to claim 11, wherein the private branch exchange provides tracking and reporting statistics to a service subscribed to by a person who initiated said incoming call.

13. An apparatus for transferring incoming calls comprising:
a switching device configured to receive incoming calls, and a memory for storing a database comprising member profiles, each member profile associated with a person, the member profile comprising identifying information associated with the person and the identities of one or more companies selectable by the person;
wherein the switching device is configured to verify the identity of a person placing a call to the switching device and to verify a request from the person to contact a first company by determining if the first company is one of the companies stored in the member profile associated with the person, wherein the verifying the identity of the person comprises comparing the number of the call received from the person with any one of one or more numbers associated with the person in the person's member profile;
means for determining the telephone number of the incoming call;
means, if the telephone number of the incoming call is determined as a predetermined dedicated number, for assigning a specific dialed number identification service based on an automatic number identification of said dedicated number;
wherein the switching device is configured to transfer the verified request to the first company; and
means, based upon said dialed number identification service, for routing the incoming call to a specific center or agent.

14. The apparatus according to claim 13, wherein the means for routing bypasses an interactive voice response system.

15. The apparatus according to claim 13, wherein the means for routing is a private branch exchange.

16. The apparatus according to claim 15, wherein the private branch exchange is configured to provide tracking and reporting statistics to a service subscribed to by a person who initiated said incoming call.

* * * * *